United States Patent
Bruno et al.

(10) Patent No.: US 7,454,415 B1
(45) Date of Patent: *Nov. 18, 2008

(54) METHOD AND SYSTEM FOR PATTERN MATCHING HAVING HOLISTIC TWIG JOINS

(75) Inventors: Nicolas Bruno, Redmond, WA (US); Nikolaos Koudas, Springfield, NJ (US); Divesh Srivastava, Summit, NJ (US)

(73) Assignees: Trustees of Columbia University, New York, NY (US); AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/733,886

(22) Filed: Apr. 11, 2007

Related U.S. Application Data

(63) Continuation of application No. 10/747,847, filed on Dec. 29, 2003, now Pat. No. 7,219,091.

(60) Provisional application No. 60/449,648, filed on Feb. 24, 2003.

(51) Int. Cl.
*G06F 7/00* (2006.01)
*G06F 17/00* (2006.01)
(52) U.S. Cl. .......................................... 707/3; 707/100
(58) Field of Classification Search .............. 707/2–5, 707/100–102
See application file for complete search history.

(56) References Cited

U.S. PATENT DOCUMENTS

| | | | |
|---|---|---|---|
| 5,768,423 | A | 6/1998 | Aref et al. |
| 6,374,235 | B1 | 4/2002 | Chen et al. |
| 6,374,252 | B1 | 4/2002 | Althoff et al. |
| 6,917,935 | B2* | 7/2005 | Zwiegincew et al. ........... 707/4 |
| 7,219,091 | B1* | 5/2007 | Bruno et al. .................... 707/3 |
| 2003/0046073 | A1* | 3/2003 | Mori et al. ................... 704/251 |

OTHER PUBLICATIONS

"Structural Joins: A Primitive for Efficient XML Query Pattern Matching", Shurug Al-khalifa et al., Nov. 30, 2001, (http://www.eecs.umich.edu/~jignesh/publ/xmljoin-ICDE.pdf).*
Nicolas et al., "Holistic Twig Joins: Optimal XML Pattern Matching", published by ACM SIGMOD, Jun. 2002, pp. 310-321.
Wei Wang et al., "Efficient Processing of XML Path Queries Using the Disk-based F&B Index", published by Proceedings of the 31st VLDB Conference, Trondheim, Norway, 2005.
Shurug Al-Khalifa, "Structural Joins: At Primitive for Efficient XML Query Pattern Matching", published by Proceedings of the 18th International Conference on Data Engineering (ICDE'02) (1063-6382/02 2002 IEEE).
Haifeng Jiang, "Holistic Twig Joins on Indexed XML Documents", published by Proceedings of the 29th VLDB Conference, Berlin, Germany, 2003.

* cited by examiner

*Primary Examiner*—Hung T Vy

(57) ABSTRACT

A method of query pattern matching uses a chain of linked stacks to compactly represent partial results to root-to-leaf query paths, which are then composed to obtain matches for the twig pattern.

18 Claims, 17 Drawing Sheets

DATA

QUERY

FIG. 3C

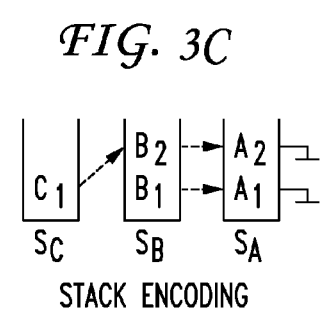

STACK ENCODING

QUERY RESULTS

FIG. 4

```
Algorithm PathStack(q)
01  while ¬end(q)
02     qmin = getMinSource(q)
03     for qᵢ in subtreeNodes(q)   // clean stacks
04        while (¬empty(Sqᵢ) ∧ topB(Sqᵢ) < nextL(Tqmin))
05           pop(Sqᵢ)
06     moveStreamToStack(Tqmin, Sqmin, pointer to
                                    top(Sparent(qmin)))
07     if (isleaf(qmin))
08        showSolutions(Sqmin, 1)
09     pop (Sqmin)
Function end(q)
   return ∀qᵢ ∈ subtreeNodes(q) : isLeaf(qᵢ) ⇒ eof(Tqᵢ)

Function getMinSource(q)
   return qᵢ ∈ subtreeNodes(q) such that nextL(Tqᵢ)
      is minimal
Procedure moveStreamToStack(Tq,Sq,p)
01  push(Sq,(next(Tq),p))
02  advance(Tq)
```
PathStack

FIG. 5

```
Procedure showSolutions(SN,SP)
// Assume, for simplicity, that the stack of the query
// nodes from the root to the current leaf node we
// are interested in can be accessed as S[1],...,S[n].
// Also assume that we have a global array index[1..n]
//    of pointers to the stack elements.
// index[i] represents the position in the i'th stack that
// we are interested in for the current solution, where
// the bottom of each stack has position 1

// Mark we are interested in position SP of stack SN.
01 index[SN] = SP
02 if (SN == 1) // we are in the root
03    // output solutions from the stacks
04    output (S[n].index[n],...,S[1].index[1])
05 else // recursive call
06    for i = 1 to S[SN].index[SN].pointer_to_parent
07       showSolutions(SN - 1, i)
```

Procedure showSolutions

FIG. 6

| | CASE 1 | CASE 1 | CASE 1 | CASE 1 |
|---|---|---|---|---|
| PROPERTY | X.R<Y.L | X.L<Y.L<br>X.R>Y.R | X.L>Y.L<br>X.R<Y.R | X.L>Y.R |
| SEGMENTS | X⎯•<br>　Y⎯• | X⎯⎯•<br>　Y⎯• | X⎯•<br>Y⎯⎯• | X⎯•<br>Y⎯• |
| TREE | ROOT<br>/Y\\<br>/•X/\\ | ROOT<br>/X\\<br>/Y•\\ | ROOT<br>/Y\\<br>/•X\\ | ROOT<br>/Y\\<br>/•X\\ |

CASES FOR PathStack AND TwigStack

FIG. 7

```
Algorithm PathMPMJ(q)
01  while (¬eof(T_q) ∧ (isRoot(q) ∨
                    nextL(q) < nextR(parent(q))))
02    for (q_i ∈ subtreeNodes(q))  // advance descendants
03      while (nextL(q_i) < nextL(parent)q_i)))
04        advance(T_{q_i})
05        PushMark(T_{q_i})
06    if (isLeaf(q))  // solution in the streams' heads
           outputSolution()
07    else PathMPMJ(child(q))
08    advance(T_q)
09    for (q_i ∈ subtreeNodes(q))  // backtrack descendants
10      PopMark(T_{q_i})
```

PathMPMJ

FIG. 8

```
Algorithm TwigStack(q)
    // Phase 1
01  while ¬end(q)
02      q_act = getNext(q)
03      if (¬isRoot(q_act))
04          cleanStack(parent(act), next(q_act))
05      if (isRoot(q_act) ∨ ¬empty(S_parent(q_act)))
06          cleanStack(q_act, next(q_act))
07          moveStreamToStack(Tq_act, pointer to
                                    top(S_parent(q_act)))
08          if (isLeaf(q_act))
09              showSolutionWithBlocking(Sq_act, 1)
10              pop(Sq_act)
11      else advance(Tq_act)
        // Phase 2
12  mergeAllPathSolutions()

Function getNext(q)
01  if (isLeaf(q) return q
02  for q_i in children(q)
03      n_i = getNext(q_i)
04      if (n_i ≠ q_i) return n_i
05  n_min = minarg_{n_i} nextL(T_{n_i})
06  n_max = maxarg_{n_i} nextL(T_{n_i})
07  while (nextR(Tq) < nextL(T_{n_max}))
08      advance(Tq)
09  if (nextL(Tq) < nextL(T_{n_min})) return q
10  else return n_min Procedure cleanStack(S, actL)
01  while (¬empty(S) ∧ (topR(S) < actL))
02      pop(S)
                                        TwigStack
```

FIG. 9

```
Algorithm TwigStackXB(q)
01  while ¬end(q)
02      q_act = getNext(q)
(03)    if (isPlainValue(T_q_act))
04          if (¬isRoot(q_act))
05              cleanStack(parent(q_act), next(q_act))
06          if (isRoot(q_act) ∨ ¬empty(S_parent(q_act)))
07              cleanStack(q_act, next(q_act))
08              moveStreamToStack(T_q_act, pointer to
                                    top(S_parent(q_act)))
09              if (isLeaf(q_act))
10                  showSolutionsWithBlocking(S_q_act, 1)
11                  pop(S_q_act)
12          else advance(T_q_act)
(13)    else if (¬isRoot(q_act) ∧ empty(S_parent(q_act)) ∧
                    nextL(T_parent(q_act)) > nextR(T_q_act))
(14)        advance(T_q_act)  // Not part of a solution
(15)    else  // Might have a child in some solution
(16)        drillDown(T_q_act)
        // Phase 2
17  mergeAllPathSolutions()

Function getNext(q)
01  if (isLeaf(q) return q
02  for q_i in children(q)
03      n_i = getNext(q_i)
(04)    if (q_i ≠ n_i ∨ ¬isPlainValue(T_n_i)) return n_i
05  n_min = minargn_i nextL(T_n_i)
06  n_max = maxargn_i nextL(T_n_i)
07  while (nextR(T_q) < nextL(T_n_max))
08      advance(T_q)
09  if (nextL(T_q) < nextL(T_n_min)) return q
10  else return n_min Procedure cleanStack(S, actL)
01  while (¬empty(S) ∧ (topR(S) < actL))
02      pop(S)
```

TwigStack

Path Length
Execution Time

Path Length
Number of Elements Read

Execution Time

Number of Elements Read

Execution Time

Number of Solutions

Execution time for complex query

Execution Time

Number of Solutions

Execution time for complex query

Exceution Tme

Number of partial solutions

Path query

Twig query

Twig query

METHOD AND SYSTEM FOR PATTERN MATCHING HAVING HOLISTIC TWIG JOINS

CROSS REFERENCE TO RELATED APPLICATIONS

The present application is a continuation of U.S. patent application Ser. No. 10/747,847, filed Dec. 29, 2003, which claims the benefit of U.S. Provisional Patent Application No. 60/449,648, filed on Feb. 24, 2003, which are incorporated herein in their entirety.

FIELD OF THE INVENTION

The present invention relates generally to processing queries in a computer system and, more particularly, to processing computer queries using pattern matching.

BACKGROUND OF THE INVENTION

As is known in the art, the eXtensible Markup Language (XML) employs a tree-structured model for representing data. Queries in XML query languages typically specify patterns of selection predicates on multiple elements that have some specified tree structured relationships. For example, the XQuery expression:

book[title='XML///author[fn=jane' AND In='doe]

matches author elements that (i) have a child subelement "fn" with content lane", (ii) have a child subelement "In" with content "doe", and (iii) are descendants of book elements that have a child title subelement with content XML. This expression can be represented as a node-labeled twig (or small tree) pattern with elements and string values as node labels.

Finding all occurrences of a twig pattern in a database is a core operation in XML query processing, both in relational implementations of XML databases, and in native XML databases. Known processing techniques typically decompose the twig pattern into a set of binary (parent-child and ancestor-descendant) relationships between pairs of nodes, e.g., the parent-child relationships (book, title) and (author, fn), and the ancestor-descendant relationship (book, author). The query twig pattern can then be matched by (i) matching each of the binary structural relationships against the XML database, and (ii) "stitching" together these basic matches.

In one known attempt at solving the first sub-problem of matching binary structural relationships, Zhang et al., "On Supporting Containment Queries in Relational Database Management Systems," Proceedings of ACM SIGMOD, 2001, (hereafter "Zhang"), proposed a variation of the traditional merge join algorithm, the multi-predicate merge join (MPMGJN) algorithm, based on the (Dodd, LeftPos RightPos, LevelNum) representation of positions of XML elements and string values. Zhang's results showed that the MPMGJN algorithm could outperform standard RDBMS join algorithms by more than an order of magnitude. Zhang is incorporated herein by reference.

A further sub-problem of stitching together the basic matches obtained using binary "structural" joins requires identifying a 'good' join ordering in a computational cost-based manner taking selectivities and intermediate result size estimates into account. A basic limitation of this traditional approach for matching query twig patterns is that intermediate result sizes can get quite large, even when the input and final result sizes are more manageable.

It would, therefore, be desirable to overcome the aforesaid and other disadvantages.

SUMMARY OF THE INVENTION

The present invention provides optimal query pattern matching. In one embodiment, each node in query twig pattern is associated with a respective stream containing positional representations of the database nodes that match the node predicate at the twig pattern node. The nodes in the streams are sorted using one or more attribute values, such as document ID and left position. Each query node is associated with a respective stack and each data node in the stacks includes a pair: a positional representation of node from the stream, and a pointer to a node in a stack containing the parent node for the node. During the computations, the nodes in the stacks from bottom to top are guaranteed to lie on a root-to-leaf path in the database and, the set of stacks contain a compact encoding of partial and total answers to the query twig pattern.

BRIEF DESCRIPTION OF THE DRAWINGS

The invention will be more fully understood from the following detailed description taken in conjunction with the accompanying drawings, in which:

FIGS. 3A-3D are pictorial representations of compact encoding of answers using stacks;

FIG. 4 is a textual representation of the pathstack algorithm in accordance with the present invention;

FIG. 5 is a textual representation of the show solutions procedure in accordance with the present invention;

FIG. 6 is a pictorial representation of various cases for the pathstack and twigstack algorithms in accordance with the present invention;

FIG. 7 is a textual representation of the path MPMJ algorithm in accordance with the present invention;

FIG. 8 is a textual representation of the twigstack algorithm in accordance with the present invention;

FIG. 9 is a textual representation of the twigstackXB algorithm in accordance with the present invention;

DETAILED DESCRIPTION OF THE INVENTION

The present invention provides a holistic twig join algorithm, "TwigStack," for matching an XML query twig pattern. The Twigstack algorithm uses a chain of linked stacks to compactly represent partial results to root-to-leaf query paths, which are then composed to obtain matches for the twig pattern. When the twig pattern uses only ancestor-descendant relationships between elements, TwigStack is I/O and CPU optimal among sequential algorithms that read the entire input: it is linear in the sum of sizes of the input lists and the final result list, and independent of the sizes of intermediate results. In another aspect of the invention, a modification of so-called B-trees can be used, along with the TwigStack algorithm, to match query twig patterns in sub-linear time.

The inventive holistic twig join approach for matching XML query twig patterns creates relatively small intermediate results. Processing uses the (DocId, LeftPos:RightPos, LevelNum) representation of positions of XML elements and string values that succinctly capture structural relationships between nodes in the XML database. The inventive Twigstack algorithm can also use a chain of linked stacks to compactly represent partial results to individual query root-to-leaf paths, which are then composed to obtain matches to the query twig pattern. Since a relatively large amount of XML data is expected to be stored in relational database management systems (RDBMS), such as from Oracle, IBM and Microsoft, it will be appreciated that RDBMS systems will benefit from the inventive query processing using holistic twig joins for efficient XML query processing. It is understood that the invention is also applicable to native XML query engines, since holistic twig joins are an efficient, set-at-a-time strategy for matching XML query patterns, in contrast to the node-at-a-time approach of using tree traversals.

Before describing the invention in detail, some background information is presented below. An XML database is a forest of rooted, ordered, labeled trees, with each node corresponding to an element or a value and the edges representing (direct) element-subelement or element-value relationships. Node labels include a set of (attribute, value) pairs, which suffices to model tags, IDs, IDREFs, etc. The ordering of sibling nodes implicitly defines a total order on the nodes in a tree, obtained by a preorder traversal of the tree nodes.

Figure 1:
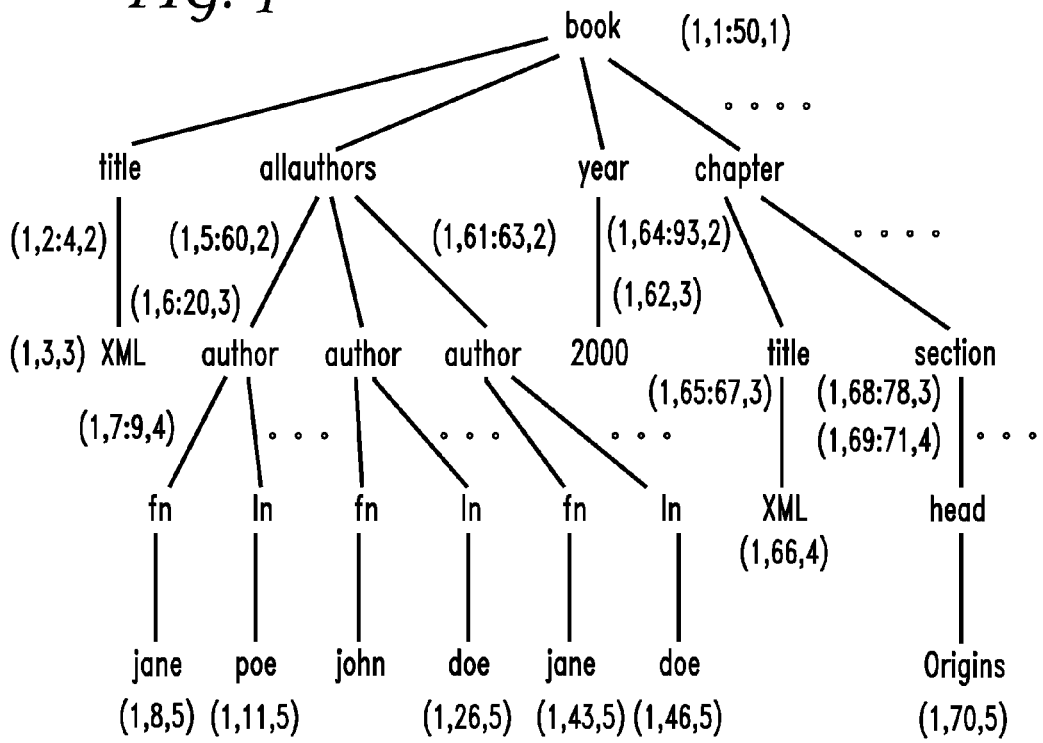
FIG. 1 is a tree representation of an exemplary XML document that can be processed in accordance with the present invention.
Figure 2A:
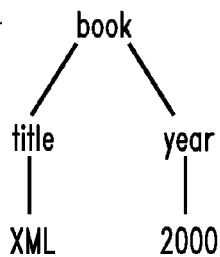
FIGS. 2A-2B are exemplary query twig patterns corresponding to queries that can be processed in accordance with the present invention.

FIG. 1 shows a tree representation of an exemplary XML document. Queries in XML query languages, such as XQuery, Quilt, and XML-QL, make use of (node labeled) twig patterns for matching relevant portions of data in the XML database. The twig pattern node labels include element tags, attribute-value comparisons, and string values, and the query twig pattern edges are either parent-child edges (depicted using a single line) or ancestor-descendant edges (depicted using a double line). For example, the XQuery expression:

book[title='XML' AND year='2000/ which matches book elements that (i) have a child title sub-element with content "XML", and (ii) have a child year sub-element with content "2000", can be represented as the twig pattern in FIG. 2A. It is understood that only parent-child edges are used in this case. Similarly, the previously described XQuery expression can be represented as the twig pattern in FIG. 2B. Note that an ancestor-descendant edge is used between the book element and the author element.

In general, at each node in the query twig pattern, there is a node predicate on the attributes (e.g., tag, content) of the node in question. It is understood that for the present invention, what is permitted in this predicate is not material. Similarly, the physical representation of the nodes in the XML database is not relevant to the results set forth below. It suffices to say that there should be efficient access mechanisms (such as index structures) to identify the nodes in the XML database that satisfy any given node predicate q, and return a stream of matches Tq.

Given a query twig pattern Q and an XML database D, a match of Q in D is identified by a mapping from nodes in Q to nodes in D, such that: (i) query node predicates are satisfied by the corresponding database nodes (the images under the mapping), and (ii) the structural (parent-child and ancestor-descendant) relationships between query nodes are satisfied by the corresponding database nodes. The answer to query Q with n nodes can be represented as n-ary relation where each tuple (di, _AO includes the database nodes that identify a distinct match of query twig pattern Q in database D.

Finding matches of a query twig pattern in an XML database is a core operation in XML query processing, both in relational implementations of XML databases, and in native XML databases. Consider the twig pattern matching problem: Given a query twig pattern Q, and an XML database D that has index structures to identify database nodes that satisfy each of Q's node predicates, compute the answer to Q on D.

Consider, for example, the query twig pattern in FIG. 2A, and the database tree in FIG. 1. This query twig pattern has one match in the data tree that maps the nodes in the query to the root of the data and its first and third subtrees. One factor in providing an efficient, uniform mechanism for set-at-a-time (join-based) matching of query twig patterns is a positional representation of occurrences of XML elements and string values in the XML database, which extends the classic inverted index data structure in information retrieval.

The position of a string occurrence in the XML database can be represented as a 3-tuple (Dodd, LeftPos, LevelNum), and analogously, the position of an element occurrence as a 3-tuple (Dodd, LeftPos:RightPos, LevelNum),where (i) Dodd is the identifier of the document; (ii) LeftPos and RightPos can be generated by counting word numbers from the beginning of the document Dodd until the start and the end of the element, respectively; and (iii) LevelNum is the nesting depth of the element (or string value) in the document. FIG. 1 shows 3-tuples associated with some tree nodes, based on this representation. Note that the Dodd for all nodes is chosen to be one.

Structural relationships between tree nodes whose positions are recorded in this fashion can be determined easily: (i) ancestor-descendant: a tree node n2 whose position in the XML database is encoded as (D2, L2: R2, N2) is a descendant of a tree node n1 whose position is encoded as (D1, L1: R1,N1) if, and only if (iff), D1=D2, L1<L2, and R2<R1 (It is understood that for leaf strings, the RightPos value is the same as the LeftPos value.); and (ii) parent-child: a tree node n2 whose position in the XML database is encoded as (D2, L2: R2, N2) is a child of a tree node ni whose position is encoded as (D1, L1: RI, N1) iff D1=D2, L1<L2, R2<R1, and N1+1=N2. For example, in FIG. 1, the author node with position (1, 6:20, 3) is a descendant of the book node with position (1, 1:150, 1), and the string "jane" with position (1, 8, 5) is a child of the author node with position (1, 7:9, 4).

It can be noted that in this representation of node positions in the XML data tree, checking an ancestor-descendant relationship is as simple as checking a parent-child relationship (one can check for an ancestor-descendant structural relationship without knowledge of the intermediate nodes on the path). Also, this representation of positions of nodes allows for checking order (e.g., node n2 follows node ni) and structural proximity (e.g., node n2 is a descendant within three levels of n1) relationships.

Let q (with or without subscripts) denote twig patterns, as well as (interchangeably) the root node of the twig pattern. In the inventive algorithms, use is made of the following twig node operations: is Leaf: Node ---÷Bool, isRoot: Node --f Bool, parent: Node ---* Node, children: Node --4 {Node}, and subtreeNodes: Node ---+ {Node}, where is Leaf checks if the operand is a leaf node, is Root checks if the operand is a root node, parent: returns the parent of the operand, children: returns the set of children of the operand, subtreenodes returns the set of descendents of the operant. Path queries have only one child per node, otherwise the function children (q) returns the set of children nodes of q. The result of operation subtreeNodes(q) is the node q and all its descendants.

Associated with each node q in a query twig pattern there is a stream Tq. The stream contains the positional representations of the database nodes that match the node predicate at the twig pattern node q (possibly obtained using an efficient access mechanism, such as an index structure). The nodes in the stream are sorted by their (Dodd, LeftPos) values. The operations over streams are: eof, advance, next, nextL, and nextR. The last two operations return the LeftPos and RightPos coordinates in the positional representation of the next element in the stream, respectively.

In the inventive stack-based algorithms, PathStack and TwigStack, each query node q is also associated with a stack Sq. Each data node in the stack includes a pair: (positional representation of a node from Tq, pointer to a node in Sparent (q)). The operations over stacks are: empty, pop, push, topL, and topR. The last two operations return the LeftPos and RightPos coordinates in the positional representation of the top element in the stack, respectively. At every point during the computation, (i) the nodes in stack Sq (from bottom to top) are guaranteed to lie on a root-to-leaf path in the XML database, and (ii) the set of stacks contains a compact encoding of partial and total answers to the query twig pattern, which can represent in linear space a potentially exponential (in the number of query nodes) number of answers to the query twig pattern, as illustrated below.

EXAMPLE

FIGS. 3A-D illustrate the stack encoding of answers to a path query for a sample data set. The answer [A2, B2, C1] is encoded since C1 points to B2, and B2 points to A2. Since A1 is below A2 on the stack SA, [A1, B2, C1] is also an answer. Finally, since B1 is below B2 on the stack SB, and B 1 points to A1, [A1, B1, C1] is also an answer. Note that [A2, B1, C1] is not an answer, since A2 is above the node (A1) on stack SA to which B1 points. The relatively compact stack encoding is used in the inventive PathStack and TwigStack algorithms.

Algorithm PathStack, which computes answers to a query path pattern, is presented in FIG. 4 for the case when the streams contain nodes from a single XML document. When the streams contain nodes from multiple XML documents, the algorithm is easily extended to test equality of Dodd before manipulating the nodes in-the streams and stacks.

One feature of Algorithm PathStack is to repeatedly construct (compact) stack encodings of partial and total answers to the query path pattern, by iterating through the stream nodes in sorted order of their LeftPos values; thus, the query path pattern nodes will be matched from the query root down to the query leaf. Line 2, in Algorithm PathStack, identifies the stream containing the next node to be processed. Lines 3-5 remove partial answers from the stacks that cannot be extended to total answers, given knowledge of the next stream node to be processed. Line 6 augments the partial answers encoded in the stacks with the new stream node. Whenever a node is pushed on the stack S1 where qmin, is the leaf node of the query path, the stacks contain an encoding of total answers to the query path, and Algorithm showSolutions is invoked by Algorithm PathStack (lines 7-9) to "output" these answers.

One way for Algorithm showSolutions to output query path answers encoded in the stacks is as n-tuples that are sorted in leaf-to-root order of the query path. This will ensure that, over the sequence of invocations of Algorithm showSolutions by Algorithm PathStack, the answers to the query path are also computed in leaf-to-root order.

Figure 4A:
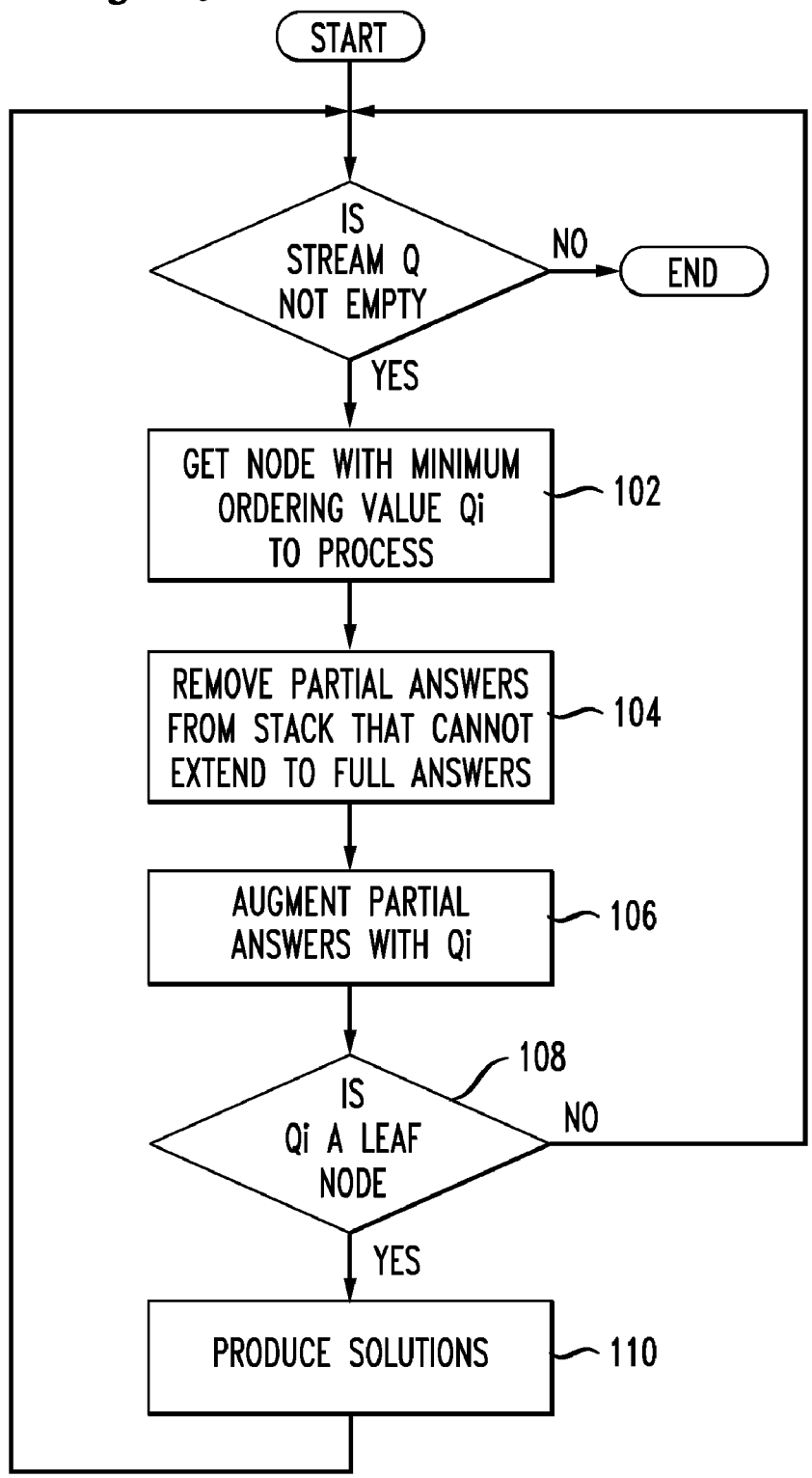
FIG. 4A is a flow diagram showing an exemplary implementation of the pathstack algorithm of FIG. 4.

FIG. 4A shows an exemplary sequence of steps for implementing the pathstack algorithm in accordance with the present invention. In step 100, it is determined whether the set of streams q in the subtree rooted at node q is not empty (line 01 in FIG. 4). That is, one tests if every stream associated with a node in the subtree rooted at q is empty. If so, the process terminates. If not, in step 102 the node having a minimum ordering value qi is retrieved for processing (function getMinsource, line 02). Partial answers that cannot extend to full answers to the query are removed in step 104 (lines 03-05). In step 106, the partial answers are augmented with the next element in the stream qi (line 06). In step 108, it is determined whether the node qi is a leaf node (line 07). If not, processing continues in step 100. If so, in step 110 solutions are produced (line 08, see showSolutions algorithm in FIG. 5 below).

FIG. 5 shows an exemplary showSolutions procedure for the case when only ancestor-descendant edges are present in the query path. When parent-child edges are present in the query path, the LevelNum information should be taken into account. PathStack does not need to change, but it should be ensured that each time showSolutions is invoked, it does not output incorrect tuples, in addition to avoiding unnecessary work. This can be achieved by modifying the recursive call (lines 6-7) to check for parent-child edges, in which case only a single recursive call (showSolutions(SN-1, S[SN].index [SN].pointer_to_theparent_stack)) needs to be invoked, after verifying that the LevelNum of the two nodes differ by one. Looping through all nodes in the stack S[SN-1] would still be correct, but it would do more work than is strictly necessary.

If it is desired that the final answers to the query path be presented in sorted root-to-leaf order (as opposed to sorted leaf-to-root order), it is easy to see that it does not suffice that each invocation of algorithm showSolutions outputs answers encoded in the stack in the root-to-leaf order. As will be appreciated by one of ordinary skill in the art, to produce answers in the sorted root-to-leaf order, the answers should be "blocked," and their output delayed until it is certain that no answer prior to them in the sort, order can be computed.

EXAMPLE

Consider the leftmost path, book-title-XML, in each of the query twigs of FIG. 2. If conventional binary structural join algorithms are used, one would first need to compute matches to one of the parent-child structural relationships: book-title, or title-XML. Since every book has a title, this binary join would produce a lot of matches against an XML books database, even when there are only a few hooks whose title is XML. If, instead, matches to title-XML are computed, there would also be matching of pairs under chapter elements, as in the XML data tree of FIG. 1, which do not extend to total answers in the query path pattern.

Using the inventive Algorithm PathStack, partial answers are compactly represented in the stacks, and not output. Using the XML data tree of FIG. 1, only one total answer identified by the mapping [book -- (1, 1:150,1), title —*(1, 2:4, 2), XML —>(1, 3, 3)], is encoded in the stacks.

From FIG. 6 it can be seen that if node Y is fixed, the sequence of cases between node Y and nodes X on increasing order of LeftPos (L) is: (112)*3*4*. Cases 1 and 2 are interleaved, then all nodes in Case 3, before any node in Case 4, and finally all nodes in Case 4.

Suppose that for an arbitrary node q in the path pattern query, one has function getMinSource(q)=qN. Also, suppose that tqN is the next element in qN's stream. Then, after tqN is pushed on to stack SqN, the chain of stacks from SqN to Sq verifies that their labels are included in the chain of nodes in the XML data tree tqN to the root.

For each node tq..n pushed on stack Sq.., it is relatively easy to see that the above property, along with the iterative nature of Algorithm showSolutions, ensures that, all answers in which tf, is a match for query node qmin will be output. This leads to the conclusion that, given a query path pattern q and an XML database D, Algorithm PathStack correctly returns all answers for q on D.

Optimality of the inventive PathStack algorithm is now discussed. Given an XML query path of length n, PathStack takes n input lists of tree nodes sorted by (Dodd, LeftPos), and computes an output sorted list of n-tuples that match the query path. It is straightforward to see that, excluding the invocations to showSolutions, the I/O and CPU costs of PathStack are linear in the sum of sizes of the n input lists. Since the "cost" of showSolutions is proportional to the size of the output list, the optimality result can be expressed as follows: given a query path pattern q with n nodes, an XML database, Algorithm PathStack has worst-case I/O and CPU time complexities linear in the sum of sizes of the n input lists and the output list. Further, the worst-case space complexity of Algorithm PathStack is the minimum of (i) the sum of sizes of the n input lists, and (ii) the maximum length of a root-to-leaf path in D. It should be noted that the worst-case time complexity of Algorithm PathStack is independent of the sizes of any intermediate results.

A straightforward generalization of the known MPMGJN algorithm for path queries proceeds one stream at a time to get all solutions. Consider the path query q,//q2//q3. The basic steps are as follows: Get the first (next) element from the stream To and generate all solutions that use that particular element from Tqi. Then, advance rfq 1 and backtrack Tq2 and To, accordingly (i.e., to the earliest position that might lead to a solution). This procedure is repeated until To is empty. The generate all solutions step recursively starts with the first marked element in Tq2, gets all solutions that use that element (and the calling element in To), then advances the stream Tq2 until there are no more solutions within the current, element in To, and so on. This algorithm can be referred to as PathMPMJNaive.

It can be seen that maintaining only one mark per stream (for backtracking purposes) is relatively inefficient, since all marks need to point to the earliest segment that can match the current element in To (time stream of the root node). An alternative strategy is to use a stack of marks, as shown in Algorithm PathMPMJ of FIG. 7. In this optimized generalization of MPMGJN, each query node will not have a single mark in the stream, but "k" marks, where k is the number of its ancestors in the query. Each mark points to an earlier position in the stream, and for query node q, the i'th mark is the first point in Tq such that the element in Tq starts after the current. element in the stream of q's i'th ancestor. Thus, given a query path pattern q and an XML database D, Algorithm PathMPMJ correctly returns all answers for q on D.

In another aspect of the invention, twig join algorithms are provided. A straightforward way of computing answers to a query twig pattern is to decompose the twig into multiple root-to-leaf path patterns, use PathStack to identify solutions to each individual path, and then merge join these solutions to compute the answers to the query. This approach, which was evaluated as described below, faces the same fundamental problem as techniques based on binary structural joins, towards a holistic solution: many intermediate results may not be part of any final answer, as illustrated below.

EXAMPLE

Figure 2B:
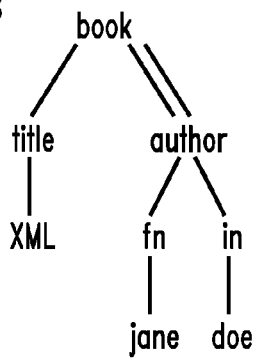

Consider the query sub-twig rooted at the author node of the twig pattern in FIG. 2B. Against the XML database in FIG. 1, the two paths of this query: author-fn Jane, and author-In-doe, have two solutions each, but the query twig pattern has only one solution.

In general, if the query (root-to-leaf) paths have many solutions that do not contribute to the final answers, using PathStack (as a sub-routine) is suboptimal, in that the over-all computation cost for a twig pattern is proportional not just to the sizes of the input and the final output, but also to the sizes of intermediate results. In one embodiment, this suboptimality is overcome using Algorithm TwigStack.

Algorithm TwigStack, which computes answers to a query twig pattern, is presented in FIG. 8, for the case when the streams contain nodes from a single XML document. As with Algorithm PathStack, when the streams contain nodes from multiple XML documents, the algorithm is readily extendable to test equality of Dodd before manipulating the nodes in the streams and on the stacks.

In one embodiment, Algorithm TwigStack operates in two phases. In the first phase (lines 1-11) shown in FIG. 8, some (but not all) solutions to individual query root-to-leaf paths are computed. In the second phase (line 12), these solutions are merge-joined to compute the answers to the query twig pattern.

Figure 8A:
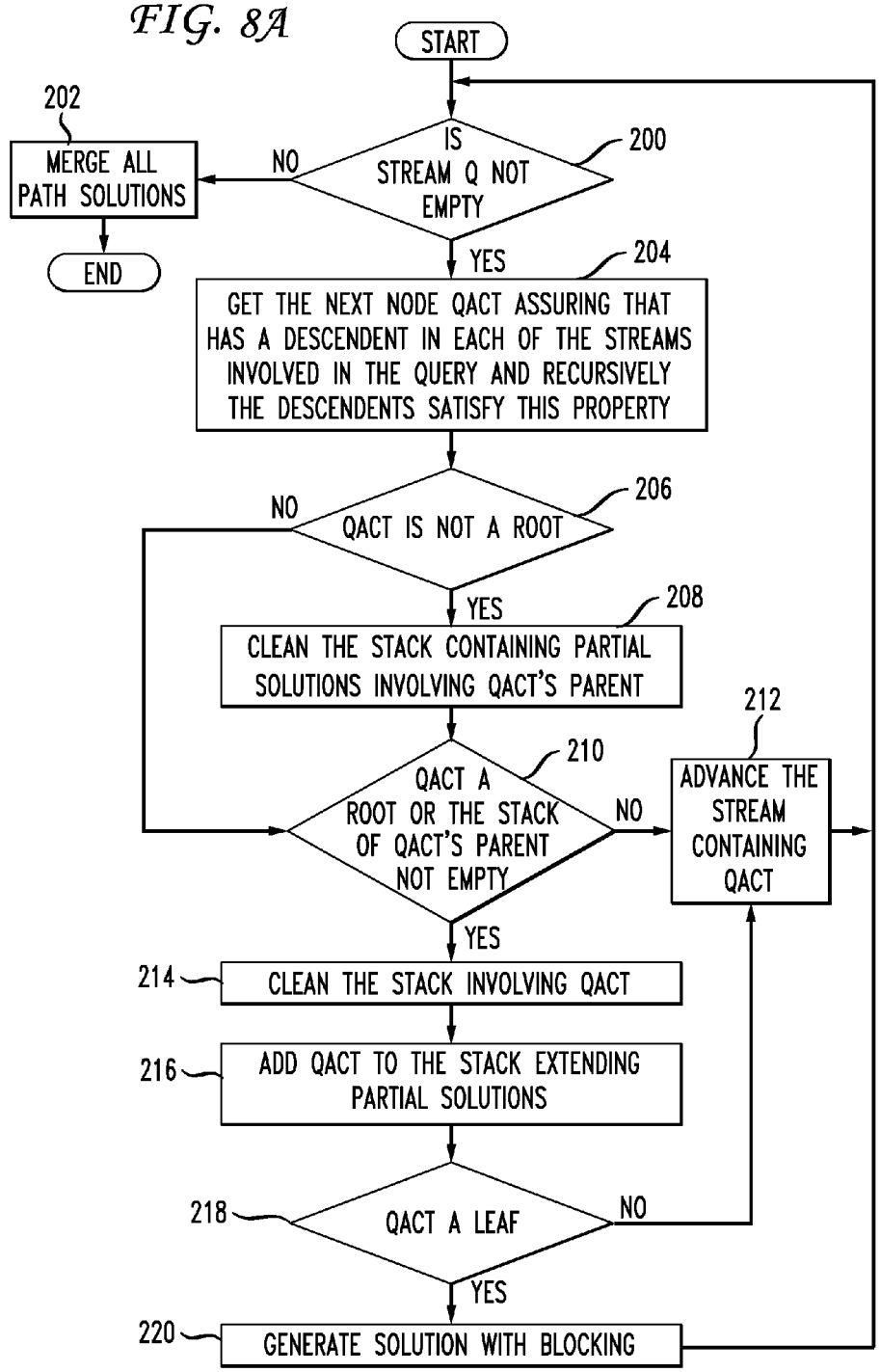
FIG. 8A is a flow diagram showing an exemplary sequence of steps for implementing the algorithm of FIG. 8.

FIG. 8A shows an exemplary sequence of steps for algorithm TwigStack of FIG. 8. In step 200, it is determined whether the set of streams q is not empty (one checks all the streams below q) (line 01 in code shown in FIG. 8). If so, assuming pass solutions have been processed as described below, in step 202 path solutions are merged (line 12). If not, in step 204 the next node qact is retrieved after confirming that the node has a descendant in each of the streams involved in the query and recursively checking that the descendants satisfy this property (line 02, function getNext(q)). In step 206, it is determined whether the node qact is not a root node. If so, in step 208, before proceeding to step 210, the stack is cleaned of contained partial solutions involving the parent of node qact. In step 210, the no branch from step 206, it is determined whether the node qact is a root node or the stack of qact's parent is not empty (line 05). If not, in step 212 the stream containing node qact is advanced (line 11) and processing continues in step 200. If so, step 214 the stack involving the node qact is cleaned and in step 216 the node qact is added to the stack extending partial solutions. In step 218, it is determined whether the node qact is a leaf node. If not, processing continues in step 212. If so, in step a solution is generated with blocking and processing continues in step 200.

One difference between PathStack and the first phase of TwigStack is that before a node hq from the stream Tq is pushed on its stack Sq, TwigStack (via its call to getNext) ensures that: (i) node hq has a descendant hq, in each of the streams Tq, for qi E children(q), and (ii) each of the nodes hq, recursively satisfies the first property. Algorithm PathStack does not satisfy this property (and it does not need to do so to ensure (asymptotic) optimality for query path patterns). Thus, when the query twig pattern has only ancestor-descendant edges, each solution to each individual query root-to-leaf path is guaranteed to be merge joinable with at least one solution to each of the other root-to-leaf paths. This ensures that no intermediate solution is larger than the final answer to the query twig pattern.

The second merge-join phase of Algorithm TwigStack is linear in the sum of its input (the solutions to individual root-to-leaf paths) and output (the answer to the query twig pattern) sizes, only when the inputs are in sorted order of the common prefixes of the different query root-to-leaf paths. This requires that the solutions to individual query paths be output in root-to-leaf order as well, which necessitates blocking; showSolutions (shown in FIG. 5), which outputs solutions in sorted leaf-to-root order, cannot be used.

EXAMPLE 2

Consider again the query of Example 1, which is the subtwig rooted at the author node of the twig pattern in FIG. 2B, and the XML database tree in FIG. 1. Before Algorithm TwigStack pushes an author node on the stack Sauthor, it ensures this author node has: (i) a descendant fn node in the stream Tti, (which in turn has a descendant jane node in Tjane), and (ii) a descendant In node in the stream Tip, (which in turn has a descendant doe node in Tdoe). Thus, only one of the three author nodes (corresponding to the third author) from the XML data tree in FIG. 1 is pushed on the stacks. Subsequent steps ensure that only one solution to each of the two paths of this query: author-fi-jane, and author-In-doe, is computed. Finally, the merge-join phase computes the desired answer.

Consider a twig query Q. For each node q e subtreeNodes (Q) one can define the head of q, denoted hq, as the first element in Tq that participates in a solution for the sub-query rooted at q. One can say that a node q has a minimal descendant extension if there is a solution for the sub-query rooted at q composed entirely of the head elements of subtreeNodes(q).

Suppose that for an arbitrary node q in the twig query tree there is that getNext(q)=qN. Then the following properties hold:

qn has a minimal descendant extension.
For each node q'£ subtreeNodes(qN), the first element in To is hqi.
Either (a) q=qN or (b) parent(qN) does not have a minimal right extension because of qN (and possibly other nodes). In other words, the solution rooted at p=parent(qN) that uses hp does not use hq for node q but some other element whose L component is larger than that of hq.

Thus, when some node qN is returned by getNext, Ito is guaranteed to have a descendant extension in subtreeNodes (qN). It can also be seen that any element in the ancestors of qN that uses hqN in a descendant extension was returned by qN before hqN. Therefore one can maintain, for each node q in the query, the elements that are part of a solution involving other elements in the streams of subtreeNodes(q). Then, each time that qN=getNext(q) is a leaf node, one can output all solutions that use hqN. This can be achieved by maintaining one stack per node in the query.

When given a query twig pattern q and an XML database D, Algorithm TwigStack correctly returns all answers for q on D. Consider a query twig pattern q with n nodes, and only ancestor-descendant edges, and an XML database D. Algorithm TwigStack has worst-case I/O and CPU time complexities linear in the sum of sizes of the n input lists and the output list. Further, the worst-case space complexity of Algorithm TwigStack is the minimum of (i) the sum of sizes of the n input lists, and (ii) n times the maximum length of a root-to-leaf path in D. Note that for the case of query twigs with ancestor-descendant edges, the worst-case time complexity of Algorithm TwigStack is independent of the sizes of solutions to any root-to-leaf path of the twig.

It is understood that the above is true only for query twigs with ancestor-descendant edges. In the case where the twig pattern contains a parent-child edge between two elements, Algorithm TwigStack is no longer guaranteed to be I/O and CPU optimal. In particular, the algorithm might produce a solution for one root-to-leaf path that does not match with any solution in another root-to-leaf path.

Consider the query twig pattern with three nodes: A, B and C, and parent-child edges between (A, B) and between (A, C). Let the XML data tree consist of node A1, with children (in order) Az, B2, C2, such that A2 has children B1, C1. The three streams TA, TB and, Tc have as their first elements A1, B1 and C1, respectively. In this case, one cannot say if any of them participates in a solution without advancing other streams, and one cannot advance any stream before knowing if it participates in a solution. As a result optimality cannot be guaranteed.

Algorithms PathStack and TwigStack process each node in the input lists to check whether or not it is part of an answer to the query (path or twig) pattern. When the input lists are very long, this may take a significant amount of time. As described below, a variant of B-trees, denoted XB-tree, can be used on the input lists to speed up processing.

The XB-tree is a variant of the B-tree designed for indexing the positional representation (DocId, LeftPos:RightPos, LevelNum) of elements in the XML tree. The index structure when all nodes belong to the same XML document is described below; the extension to multiple documents is straightforward.

The nodes in the leaf pages of the XB-tree are sorted by their LeftPos (L) values, which is similar to the leaf pages of a B-tree on the L values. The difference between a B-tree and an XB-tree is in the data maintained at internal pages. Each node N is an internal page of the XB-tree consisting of a bounding segment [N.L, N.R] (where L denotes LeftPos and R denotes RightPos) and a pointer to its child page N.page (which contains nodes with bounding segments completely included in [N.L, N.R]). The bounding segments of nodes in internal pages might partially overlap, but their L positions are in increasing order. Besides, each page P has a pointer to the parent page P.parent and the integer P.parentIndex, which is the index of the node in P.parent that points back to P. The construction and maintenance of an XB-tree is similar to that of a B-tree, using the L value as the key; the difference is that the R values need to be propagated up the index structure.

Using an XB-tree, a pointer act=(actPage, actIndex) to the actIndex'th the node in page actPage of the XB-tree is maintained. Two operations over the XB-tree that affect this pointer include advance and drillDown. For operation advance, if act=(actPage, actIndex) does not point to the last node in the current page, one simply advances actIndex. Otherwise, act is replaced with the value (actPage.parent, actPage.parentIndex) and recursively advances it.

For operation drilldown, if act=(actPage, actIndex), actPage is not a leaf page, and N is the actIndex'th node in actPage, act is replaced with (N.page,0) so that it points to the first node in N.p.

Initially act=(rootpage, 0), pointing to the first node in the root page of the XB-tree. When act points to the last node in rootPage and it is advanced, the traversal is finished. Algorithm TwigStackXB, shown in FIG. 9, extends Algorithm TwigStack so that it uses XB-trees. The only changes are in the lines indicated by parentheses. The function isPlainValue returns true if the actual pointer in the XB-tree is pointing to a leaf node (actual value in the original stream). If one defines isPlainValue(T)=true when T is not an XB-tree but a regular file, this algorithm reduces to the previous one. Given a query twig pattern q and an XML database D, Algorithm TwigStackXB correctly returns all answers for q on D.

Figure 9A:
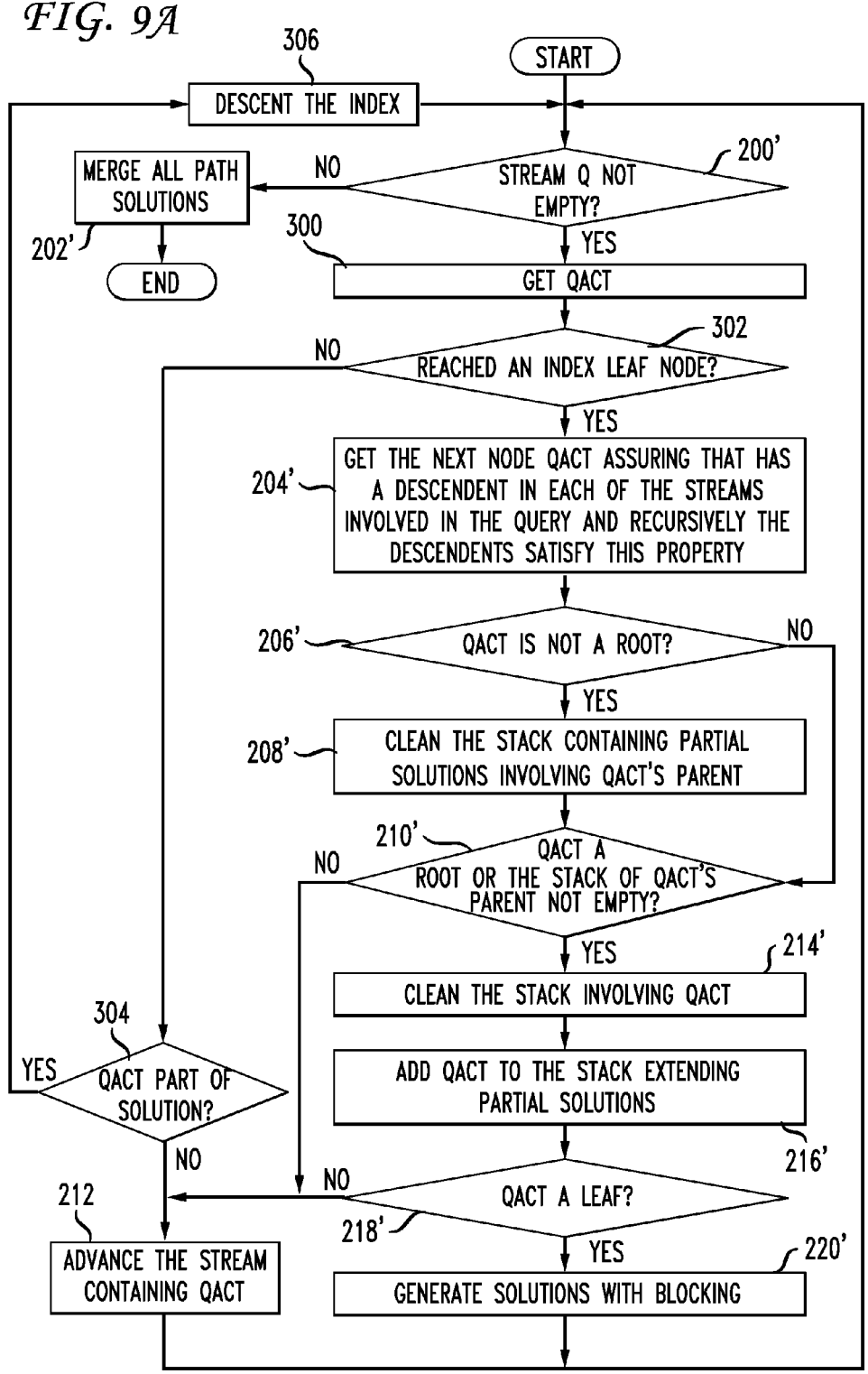
FIG. 9A is a flow diagram showing an exemplary sequence of steps for implementing the algorithm of FIG. 9.

FIG. 9A shows an exemplary sequence of steps for implementing TwigStackXB. It is understood that there is overlap between processing steps for TwigStack (FIG. 8A) and TwigStackXB (FIG. 9A), which includes indexing. Accordingly, to avoid unnecessary redundancy of description steps with significant commonality will have the same reference number with the addition of a prime, i.e., "'" in FIG. 9A. In step 200' it is determined whether the stream q is not empty. If so, in step 300 the node qact is retrieved and in step 302 it is determined whether the node qact is an index leaf node. If so, then processing continues with step 204' etc. If not, then in step 304, it is determined whether node qact is part of a solution. If the node qact is not part of the solution then in step 212' the stream containing the node qact is advanced through the index and processing continues in step 200'. If the node qact is part of the solution in step 306 the index is descended and processing continues in step 200'.

Experimental results on the efficiency of Algorithm TwigStackXB described below show that it performs matching of query twig patterns in sub-linear time. The inventive XML join algorithms were implemented in C++ using the file system as the storage engine. Experiments were run on a 550 Mhz Pentium III processor with 768 MB of main memory and a 2 GB quota of disk space. Synthetic and real-world data were used. The synthetic data sets are random trees generated using three parameters: depth, fan-out and number of different labels. For most of the experiments presented involving synthetic data sets, full binary and ternary trees were generated. Unless specified explicitly, the node labels in the trees were uniformly distributed. Other configurations (larger fanout and random depths in the tree) were tried including the use of the so-called XMach-1, and XMark benchmarks.

The real data set is an "unfolded" fragment of the DBLP database. In the DBLP dataset, each author is represented by a name, a homepage, and a list of papers. In turn, each paper contains a title, the conference where it was published, and a list of coauthors. The unfolded fragments of DBLP were generated as follows. It was started with an arbitrary author and converting the corresponding information to XML format. For each paper, each coauthor name was replaced with the actual information for that author. The Unfolding of authors was continued until reaching a previously traversed author, or a depth of 200 authors. The resulting XML data set has depth 805 and around 3 million nodes, representing 93,536 different papers from 36,900 unique authors.

Figure 10:
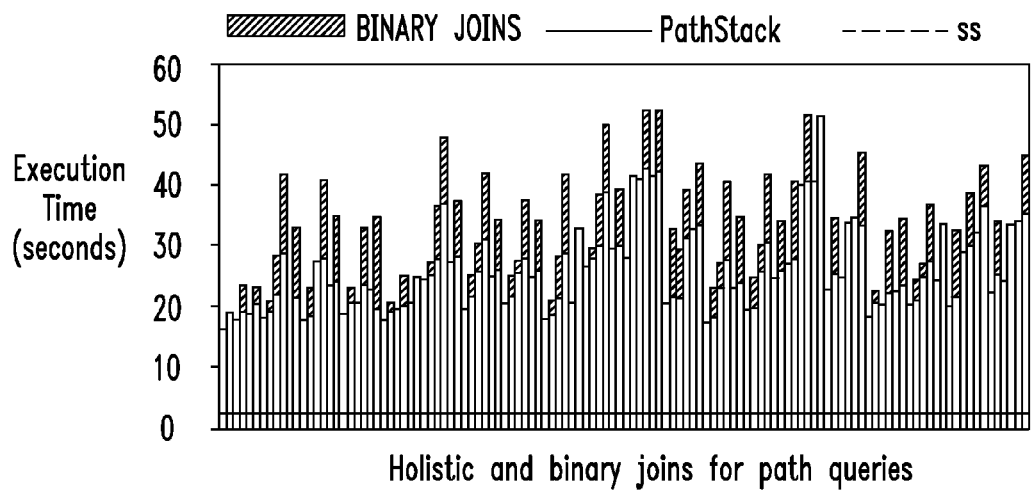
FIG. 10 is a graphical depiction of holistic and binary joins for path queries.

In the experiment described below, the inventive holistic PathStack algorithm was compared against strategies that use a combination of binary structural joins. For this purpose, a synthetic data set was used consisting of 1,000,000 nodes and six different labels: A1, A2, ..., A6. Note that the actual XML data can contain many more labels, but that does not affect the techniques since one only access the indexes of labels present in the query. The path query A1//A2// ... //A6 was issued and evaluated using PathStack. Then, all binary join strategies resulting from applying all possible join orders were evaluated. FIG. 10 shows the execution time of all join strategies, where each strategy is represented with a bar. There is also shown with a solid line the execution time of PathStack, and with a dotted line the time it takes to do a sequential scan over the input data (labeled SS).

For this query, the PathStack algorithm took 2.53 s, slightly more than the 1.87 s taken by the sequential scan over the input data. In contrast, the strategies based on binary structural joins ranged from 16.1 s to 53.07 s. One conclusion is that optimization plays a role for binary structural joins, since a bad join ordering can result in a plan that is more than three times worse than the best plan. Another conclusion is that the holistic strategy is superior to the approach of using binary structural join for arbitrary join orders. In this example, it results in more than a six-fold improvement in execution time over the best strategy that uses binary structural joins.

Figure 11:
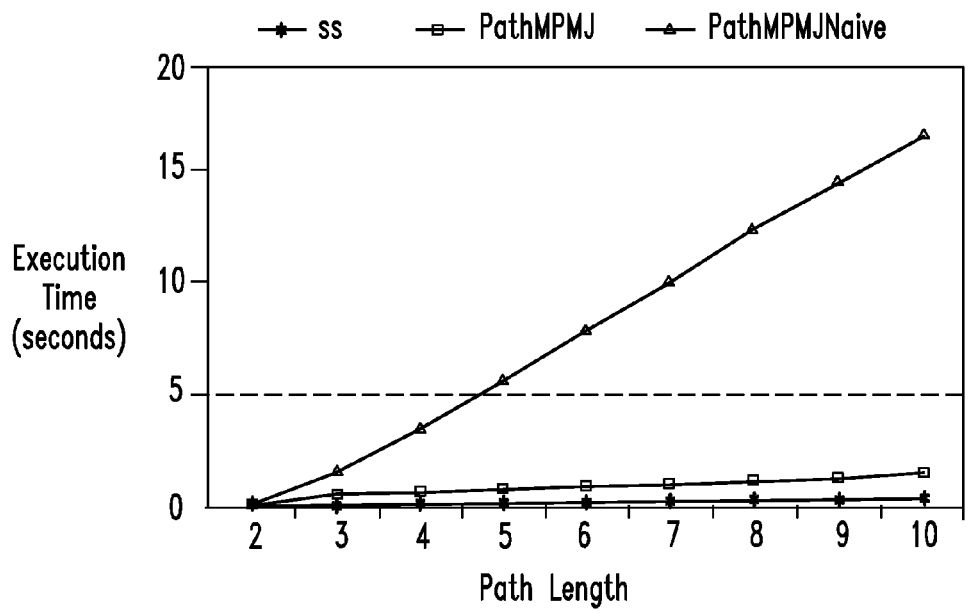
FIG. 11 is a graphical depiction of pathMPMJ versus pathMPMJNative.

The efficiency of the different holistic path join algorithms described above can be evaluated. For example, the two versions of PathMPMJ can be compared. A 64 k synthetic data set can be used, with labels A1, . . . . Aio, and issue path queries of different, lengths. FIG. 11 shows the execution times of both techniques, as well as the time taken for a sequential scan over the input data. Algorithm PathMPMJNaive is slower compared to the optimized PathMPMJ (generally over an order of magnitude). It appears that PathMPMJNaive is overly conservative when backtracking and reads several times unnecessary portions of the data (in one experiment, as much as 15 times more nodes than PathMPMJ). Since the performance of PathMPMJNaive degrades considerably with the size of the data set and the length of the input query, this strategy is not considered further.

Figure 12A:
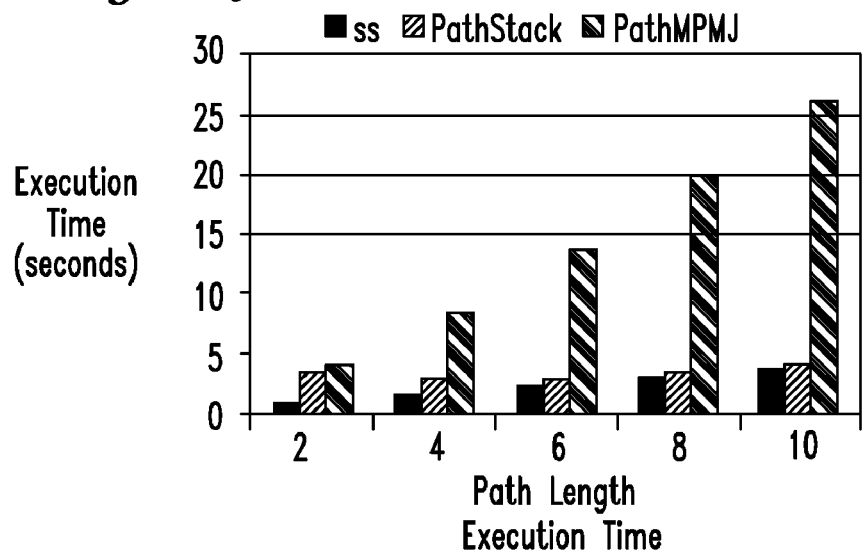
FIG. 12A is a graphical depiction of execution time versus pathlength for pathstack and pathMPMJ.
Figure 12B:
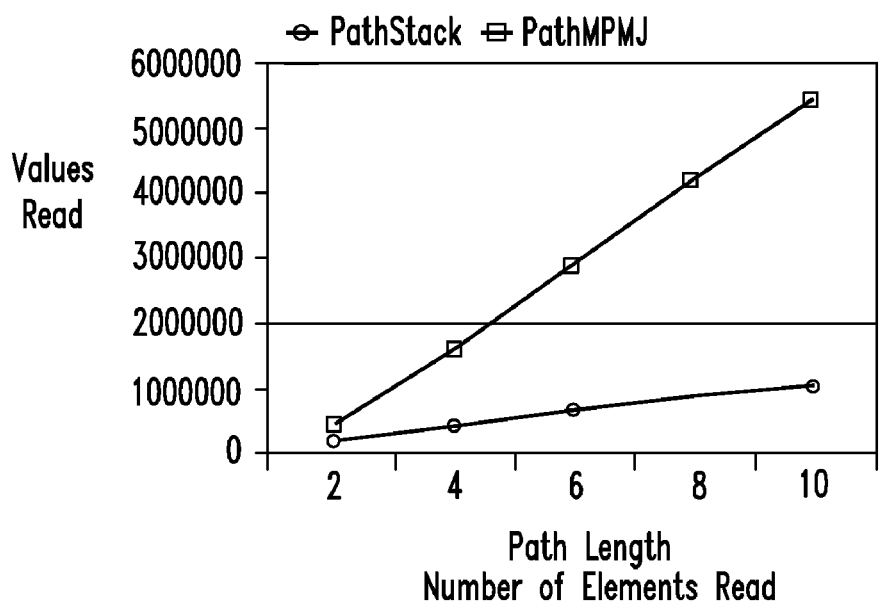
FIG. 12B is a graphical depiction of the number of elements read versus pathlength for pathstack and pathMPMJ.

Algorithm PathStack is now compared against PathMPMJ. FIGS. 12A and 12B show the execution time and the number of nodes read from disk for path queries of different lengths and a synthetic data set of 1,000,000 nodes and 10 different labels. It can be seen that algorithm PathStack provides considerably better performance than PathMPMJ, and this difference increases with longer path queries. This appears to be explained by the fact that PathStack makes a single pass over the input data, while PathMPMJ needs to backtrack and read again large portions of data. For instance, for a path query of length 10, PathMPMJ reads the equivalent of five times the size of the original data, as seen in FIG. 12B. In FIG. 12A, for path queries of length two, the execution time of PathStack is considerably slower then that of the sequential scan, and closer to PathMPMJ. This behavior is due to the fact that for the path query of length two, the number of solutions is rather large (more than 100,000), so most of the execution time is used in processing these solutions and writing them back to disk. For longer path queries, the number of solutions is considerably smaller, and the execution of PathStack is closer to a sequential scan and more efficient than PathMPMJ.

Figure 13A:
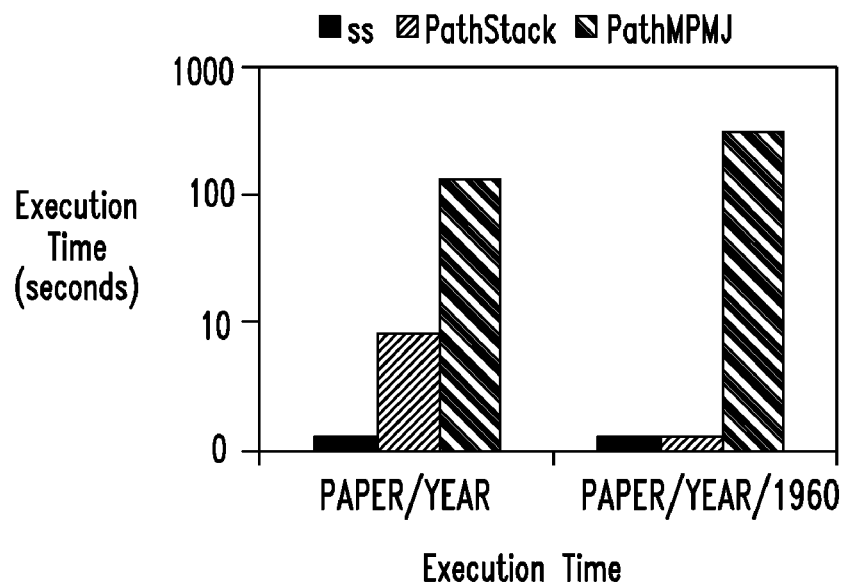
FIG. 13A is a graphical depiction of execution time versus an unfolded DBLP data set for pathstack and pathMPMJ.
Figure 13B:
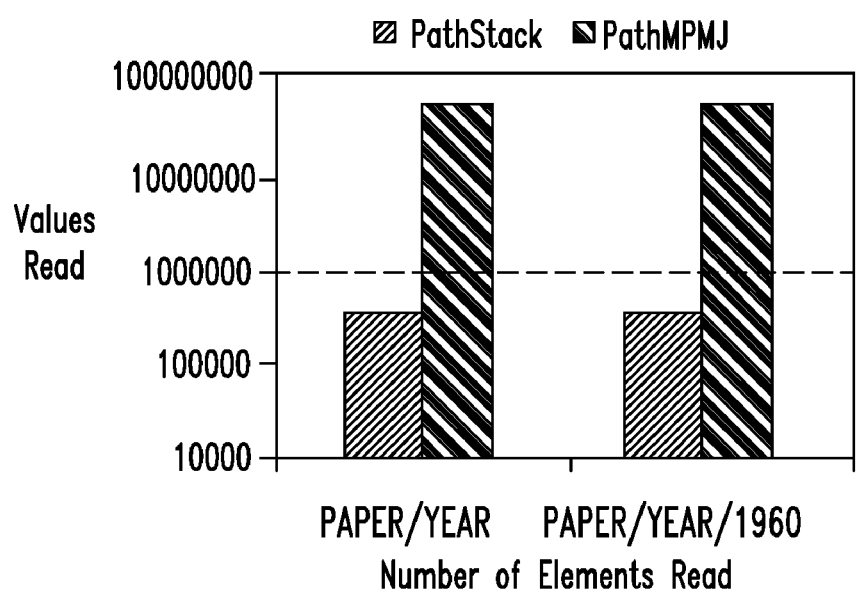
FIG. 13B is a graphical depiction of the number of elements read versus an unfolded DBLP data set for pathstack and pathMPMJ.

FIG. 13 shows the execution time and number of values read for two simple path queries over the unfolded DBLP data set (note the logarithmic scale on the Y axis). Due to time-specific nesting properties between nodes in this data set, the PathMPMJ algorithm spends much time backtracking and reads several times the same values. For instance, for the path query of length three in FIG. 13, PathMPMJ reads two orders of magnitude more elements than PathStack.

Now examining twig queries, TwigStack can be compared against the native application of PathStack to each branch in the tree followed by a merge step. As described above, Twig-Stack is optimal for ancestor/descendant relationships, but it may be suboptimal for parent/child relationships.

Figure 14A:
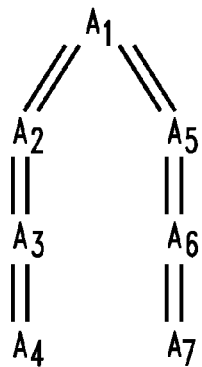
FIGS. 14A-14C are pictorial representations of twig queries processed in accordance with the present invention.
Figure 14B:
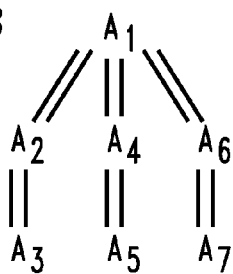
Figure 14C:
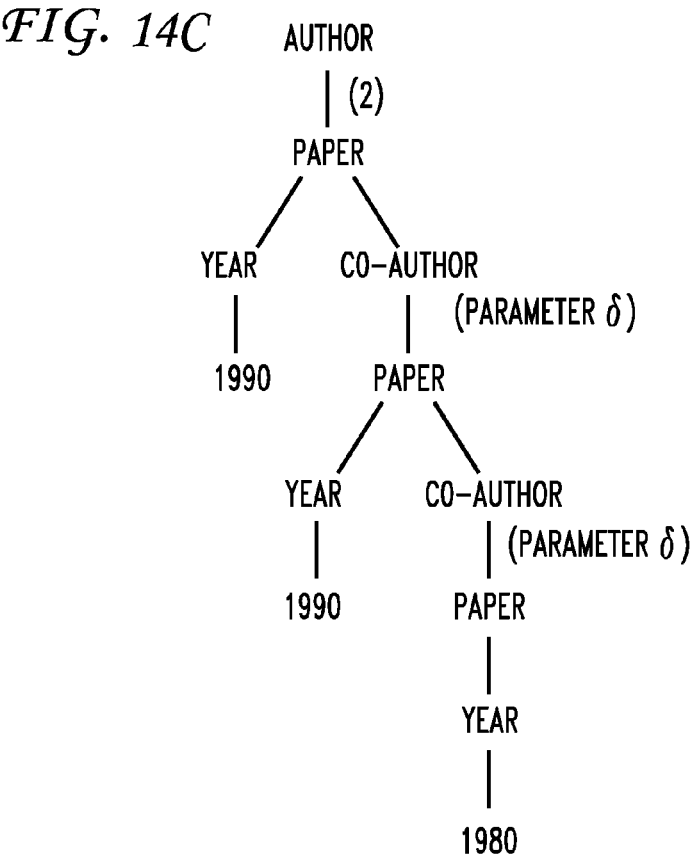

FIGS. 14A-C show a series of twig queries. The twig query of FIG. 14A was used over different synthetically generated data sets. Each data set was generated as a full ternary tree. The first subtree of the root node contained only nodes labeled A1, A2, A3 and A4. The second subtree contained nodes labeled A1, A5, A6 and A7. Finally, the third subtree contained all possible nodes. Thus, there are many partial solutions in the first two subtrees but those do not produce any complete solution. Only the third subtree contains actual solutions.

Figure 15A:
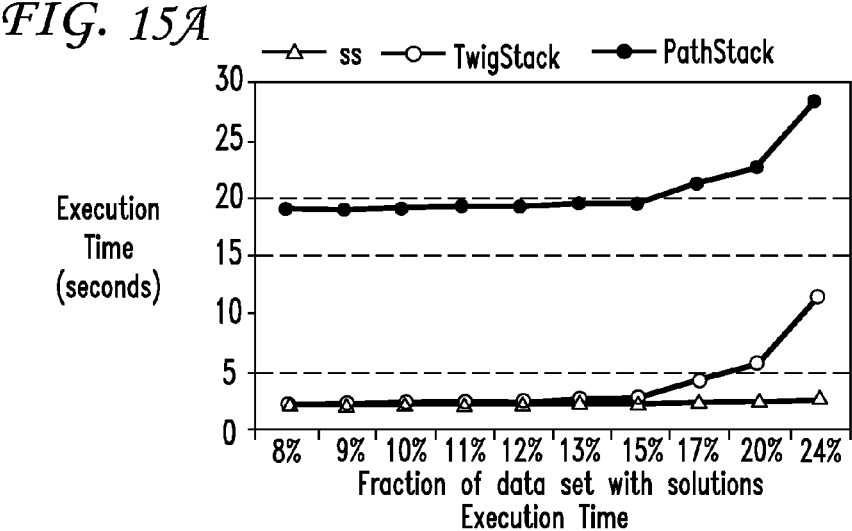
FIGS. 15A-15C are graphical representations of performance characteristics for pathstack and twigstack for first and second twig queries.
Figure 15B:
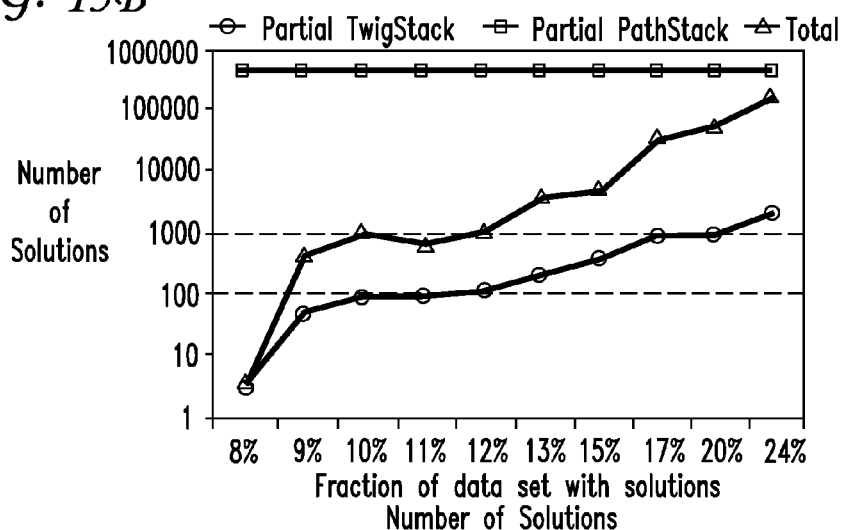

The size of the third subtree was varied relative to the sizes of the first two subtrees from 8% to 24% (beyond that point the number of solutions became too large). FIGS. 15A-B show the execution time of PathStack and TwigStack and the number of partial solutions each algorithm produces before the merging step. The consistent gap between TwigStack and PathStack results from the latter generating all partial solutions from the first two subtrees, which are later discarded in the merge step (A1//A2//A3//A4) cc (A1//A5HA6//A7). As can be seen in FIG. 15B, the number of partial solutions produced by PathStack is several orders of magnitude larger than that of the TwigStack algorithm. The number of solutions to the query computed by both algorithms is, of course, the same.

The twig query of FIG. 14B was then used. Different synthetic data sets were generated in the following way. As before, each data set is a full ternary tree. The first subtree does not contain any nodes labeled A2 or A3. The second subtree does not contain any A4 or A5 nodes. Finally, the third subtree does not contain any A6 or A7 nodes. Therefore, there is not even a single solution for the query twig, although each subtree contains a large number of partial solutions. One difference with the previous experiment is that one needs to materialize an intermediate join result before getting the final answer. Therefore, there is no execution strategy using Path-Stack that avoids materializing a relatively large intermediate result.

Figure 15C:
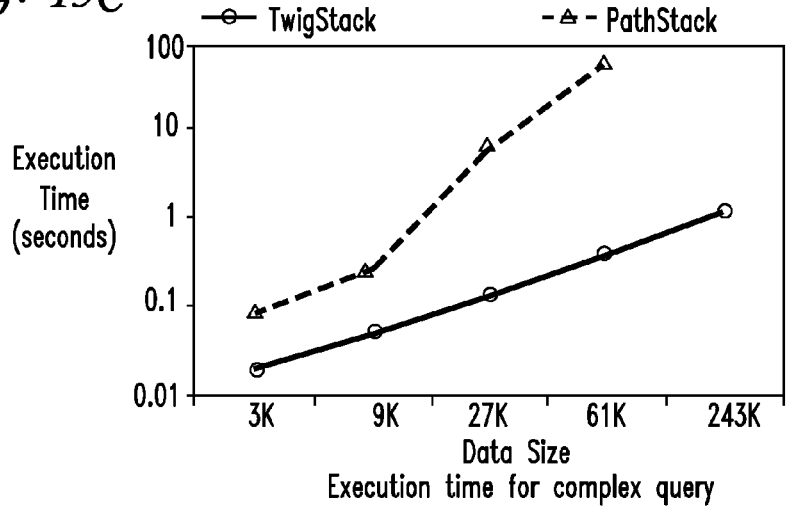

FIG. 15C shows the execution time for PathStack and TwigStack for different data sizes (note the logarithmic scale). For the last data set (with 243K nodes), PathStack could not finish since the intermediate result filled all the available space on disk (2 GB).

As discussed above, TwigStack is not optimal for parent/child relationships. Even in this case, TwigStack performs better than PathStack. The queries in FIGS. 14A and 14B were modified by adding the following constraint: all ancestor-descendant relationships are connected by a path of length between one and three (this can be checked by comparing the LevelNum values of the positional representations).

Figure 16A:
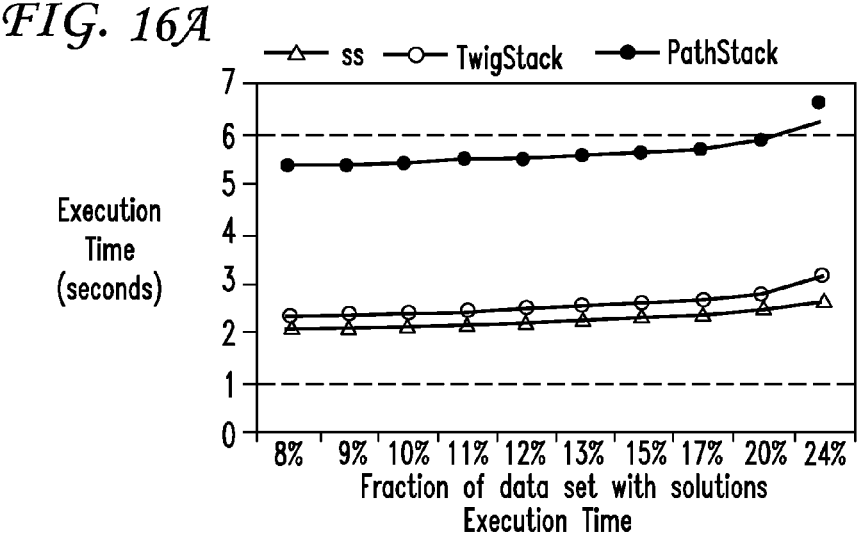
FIGS. 16A-16C are graphical representations of performance characteristics for pathstack and twigstack for a parent-child twig query.
Figure 16B:
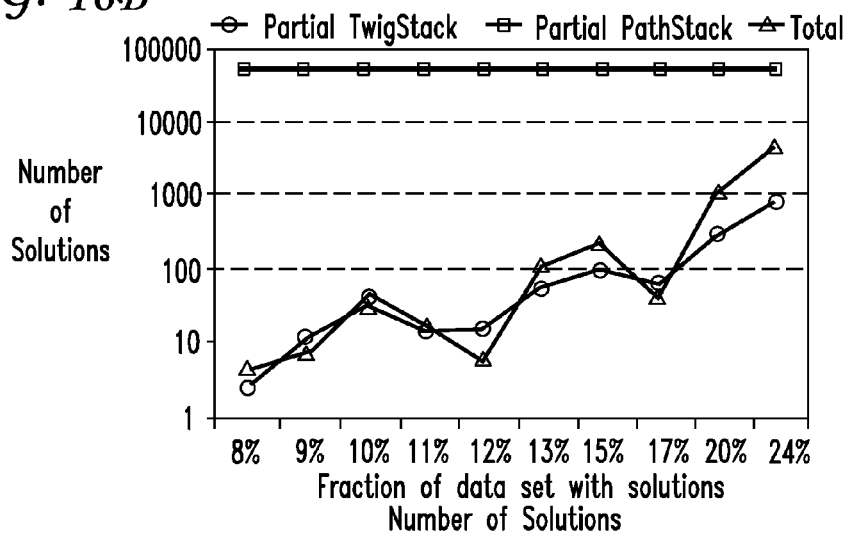
Figure 16C:
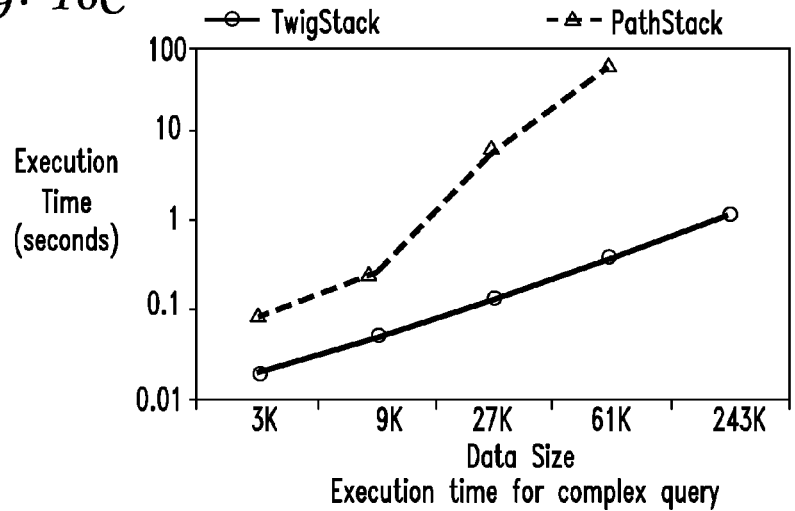

FIGS. 16A-C show the results for these experiments. Even in the presence of parent-child constraints, TwigStack is considerably more efficient than PathStack. In particular, FIG. 16B shows that the number of partial solutions produced by TwigStack (though not minimal) is small. The non-minimality is evident from the observation that the number of partial solutions produced by TwigStack is sometimes larger than the number of total solutions to the query twig.

Figure 17A:
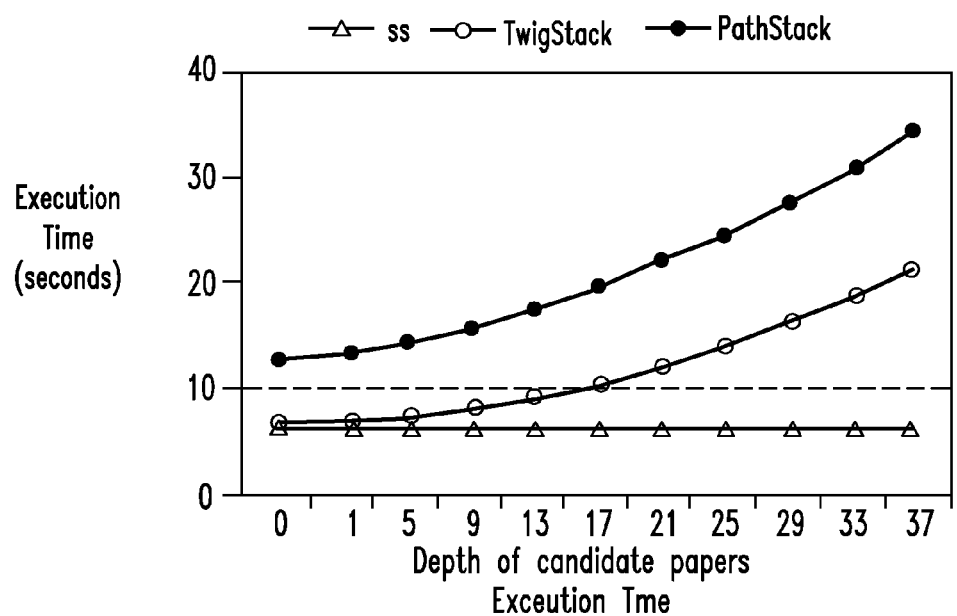
FIGS. 17A-17B are graphical representations of performance characteristics for pathstack and twigstack on a data set.
Figure 17B:
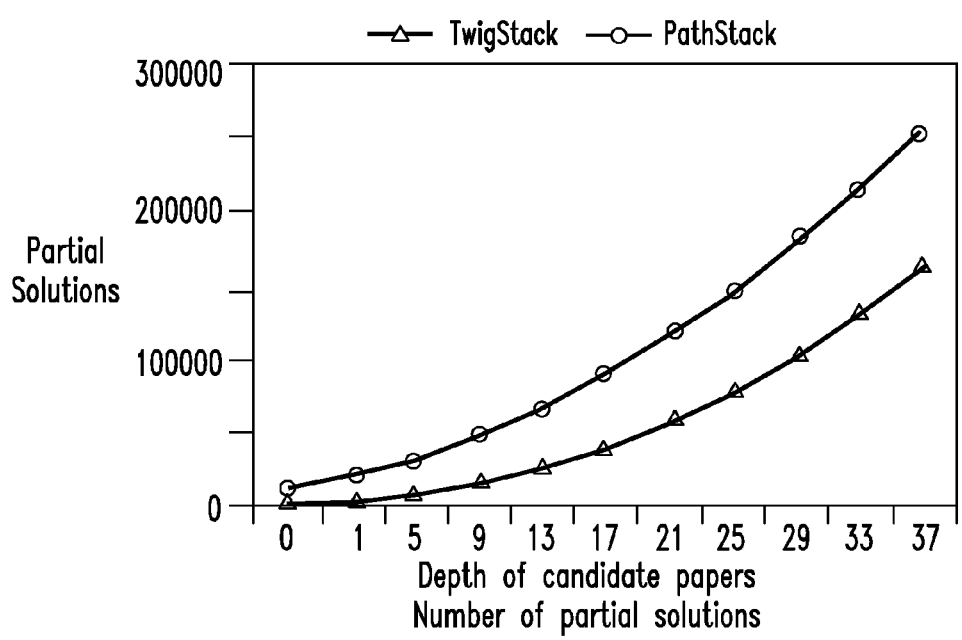

The query of FIG. 14(c) was also evaluated over the unfolded DBLP data set. This query asks for authors with papers published in the year 2000 who have some coauthor with a paper published in 1990, who in turn has some coauthor with a paper in 1980. The allowed depth was varied in the relationship COAUTHOR II PAPER, i.e., the number of coauthor and papers one can traverse from a given author, from 0 (no solutions) to 37. The results are shown in FIGS. 17A and 17B. It can be seen that for these queries, TwigStack is again more efficient than PathStack.

The advantages of using XB-trees to process path and twig queries can be evaluated. In particular, it is shown that the number of nodes that need to be read from the XB-tree (counting both leaf and internal nodes) is significantly smaller than the size of the input, which causes sub-linear behavior in the inventive algorithm. As will be seen, XB-trees with small node capacities can effectively skip many leaf nodes, but the number of internal nodes traversed is large. On the other hand, for large node capacities there are fewer internal node accesses, but XB-trees cannot skip many leaf nodes because they could miss some solutions. The best experimental results were obtained when using node capacities ranging from 4 to 64.

Figure 18A:
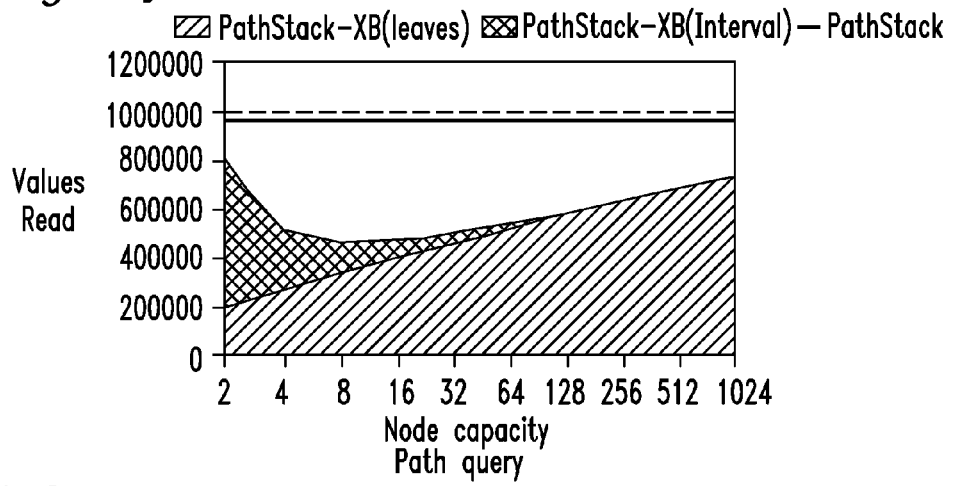
FIGS. 18A-18C are graphical representations of the number of elements read versus node capacity using XB trees.
Figure 18B:
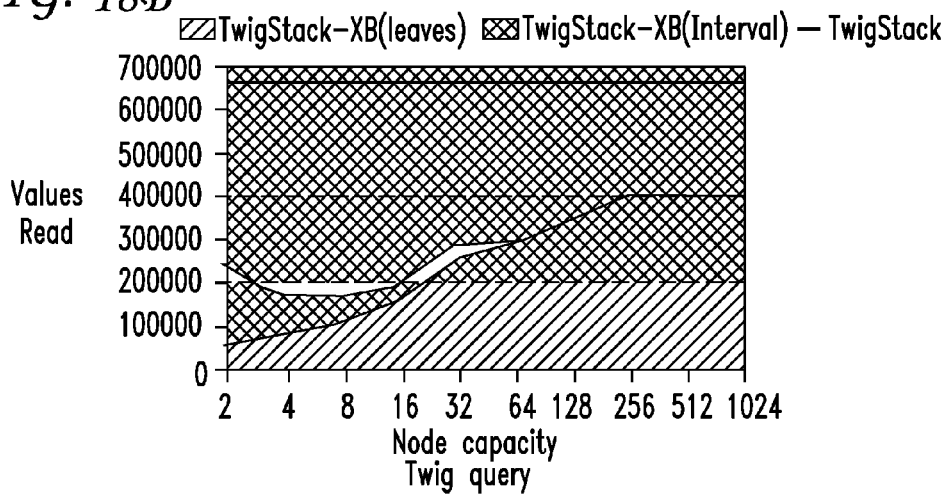
Figure 18C:
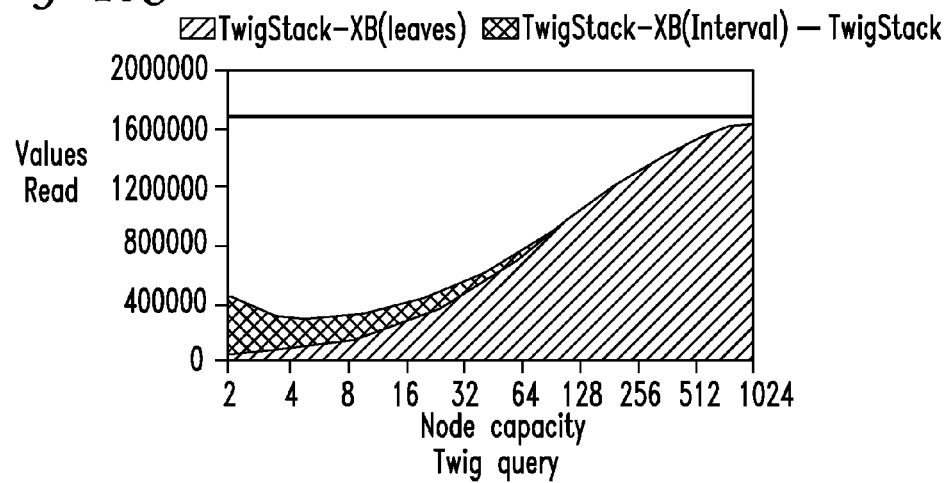

For these experiments, different queries were evaluated using PathStack and TwigStack, with and without XB-trees. The node capacity of the XB-trees was varied between 2 and 1,024 values per index node. FIG. 18A shows the number of values read in the XB-tree (separated into internal and leaf accesses) for the data set and path queries. FIG. 18B shows the results when using the twig query of FIG. 14A. FIG. 18C shows the results for the twig query in FIG. 14C over the unfolded DBLP data set.

In general, the total number of nodes visited in the XB-Tree is consistently smaller than the input data size for a wide range of node capacities. For the synthetic data set, better results were obtained for complex queries. In those situations, XB-Trees can prune significant portions of the input data. In contrast, for simpler queries, one needs to go deep in the XB-Tree nodes, in many cases down the leaves, since there are many solutions dispersed throughout the whole data set. For data sets with solutions concentrated around certain portions of the data, the impact of XB-trees is more significant, since many internal nodes can be skipped.

The present invention provides holistic join algorithms for matching XML query twig patterns, a core operation central to much of XML query processing, both for native XML query processor implementations and for relational XML query processors. In particular, Algorithm TwigStack was shown to be I/O and CPU optimal for a large class of query twig patterns, and practically efficient.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method of computing an answer to a query path pattern, comprising:
    determining whether a first set of streams in a subtree rooted at a node q is empty; and
    if so, then terminating the method and if not, then the method comprises:

(a) retrieving a first node in the first set of streams having a minimum ordering value;
(b) removing partial answers that cannot extend to full answers from a stack associated with the first node;
(c) augmenting remaining partial answers with a further stream node;
(d) determining whether the further stream node is a leaf node; and
(e) producing solutions if the further stream stream node is a leaf node, and if the first node is not a leaf node, returning to step (a);
associating nodes in a query pattern with respective streams containing positional attributes, wherein the minimum ordering value is for a first one of the positional attributes;
associating a respective stack to each node in the query pattern; and
sorting the stream nodes according to a first one of the positional attributes.

2. The method of claim 1, wherein the first one of the positional attributes corresponds to left position value.

3. The method of claim 1, wherein the positional attributes include one or more of left position value, right position value, and level number.

4. The method of claim 1, wherein the first set of streams is in a subtree rooted at a given node associated with the query pattern.

5. The method of claim 1, wherein steps (a)-(e) apply when streams contain nodes from a single XML document.

6. The method of claim 5, wherein when the streams contain nodes from multiple XML documents, the method further comprises testing equality of a DocId value before performing steps (a)-(e).

7. A computing device that computes an answer to a query path pattern, the computing device comprising:
a processor that processes functions as directed by software modules;
a module configured to determine whether a first set of streams in a subtree rooted at a node q is empty; and
a module configured to terminate if the first set of streams in the subtree rooted at the node q is empty, and to perform the following functions if the first set of streams in the subtree rooted at the node q is not empty:
(a) retrieve a first node in the first set of streams having a minimum ordering value;
(b) remove partial answers that cannot extend to full answers from a stack associated with the first node;
(c) augment remaining partial answers with a further stream node;
(d) determine whether the further stream node is a leaf node; and
(e) produce solutions if the further stream node is a leaf node, and if the first node is not a leaf node, returning to the function of module (a);
a module configured to associate nodes in a query pattern with respective stream nodes containing positional attributes, wherein the minimum ordering value is for a first one of the positional attributes;
a module configured to associate a respective stack to each node in the query pattern; and
a module configured to sort the stream nodes according to a first one of the positional attributes.

8. The computing device of claim 7, wherein the first one of the positional attributes corresponds to left position value.

9. The computing device of claim 8, wherein the positional attributes include one or more of left position value, right position value, and level number.

10. The computing device of claim 7, wherein the first set of streams is in a subtree rooted at a given node associated with the query pattern.

11. The computing device of claim 7, wherein modules (a)-(e) perform their functions when the streams contain nodes from a single XML document.

12. The computing device of claim 11, wherein when the streams contain nodes from multiple XML documents, the computing device further comprises a module configured to test equality of a DocId value before performing the functions of modules (a)-(e).

13. A computer memory storing a computer program having instructions for controlling a computing device to compute an answer to a query path pattern, the instructions comprising:
determining whether a first set of streams in a subtree rooted at a node q is empty; and
if so, then terminating and if not, then the instructions control the computing device to perform the following functions:
(a) retrieving a first node in the first set of streams having a minimum ordering value;
(b) removing partial answers that cannot extend to full answers from a stack associated with the first node;
(c) augmenting remaining partial answers with a further stream node;
(d) determining whether the further stream node is a leaf node; and
(e) producing solutions if the further stream node is a leaf node, and if the first node is not a leaf node, returning to step (a);
associating nodes in a query pattern with respective streams containing positional attributes, wherein the minimum ordering value is for a first one of the positional attributes;
associating a respective stack to each node in the query pattern; and
sorting the stream nodes according to a first one of the positional attributes.

14. The computing memory of claim 13, wherein the first one of the positional attributes corresponds to left position value.

15. The computer memory of claim 14, wherein the positional attributes include one or more of left position value, right position value, and level number.

16. The computer memory of claim 13, wherein the first set of streams is in a subtree rooted at a given node associated with the query pattern.

17. The computer memory of claim 13, wherein steps (a)-(e) apply when streams contain nodes from a single XML document.

18. The computer memory of claim 17, wherein when the streams contain nodes from multiple XML documents, the instructions further comprises testing equality of a DocId value before performing steps (a)-(e).

* * * * *